United States Patent [19]

Tanaka

[11] Patent Number: 4,744,244

[45] Date of Patent: May 17, 1988

[54] CYLINDER PRESSURE SENSOR OUTPUT COMPENSATION METHOD FOR INTERNAL COMBUSTION ENGINE

[75] Inventor: Akira Tanaka, Wako, Japan

[73] Assignee: Honda Giken Kogyo Kabushiki Kaisha, Tokyo, Japan

[21] Appl. No.: 10,670

[22] Filed: Feb. 4, 1987

[30] Foreign Application Priority Data

Feb. 19, 1986 [JP] Japan ................................. 61-34331

[51] Int. Cl.$^4$ ........................................... G01M 15/00
[52] U.S. Cl. ........................................ 73/115; 73/4 R
[58] Field of Search ........................... 73/115, 35, 4 R; 123/494

[56] References Cited

U.S. PATENT DOCUMENTS 4,531,399 7/1985 Aono ................................ 73/115 X Primary Examiner—Jerry W. Myracle
Attorney, Agent, or Firm—Armstrong, Nikaido, Marmelstein & Kubovcik

[57] ABSTRACT

A cylinder pressure sensor output compensation method for an internal combustion engine comprises the steps of determining the occurrence of a non-combustion state of engine operation, detecting the motoring cylinder pressure at this time, calculating a correction value (deviation) by comparing the detected motoring cylinder pressure with a reference value, and using this correction value to correct the sensor output during combustion of the engine. The method can be effectively applied to compensate for errors in sensor output due to variances in sensor characteristics from the time of manufacture or due to degradation through use.

12 Claims, 6 Drawing Sheets

Current cylinder
(C/A = n)

Preceding cylinder
(C/A = n−1)

4,744,244

CYLINDER PRESSURE SENSOR OUTPUT COMPENSATION METHOD FOR INTERNAL COMBUSTION ENGINE

BACKGROUND OF THE INVENTION

1. Field of the Invention

This invention relates to a cylinder pressure sensor output compensation method for internal combustion engines and more particularly to such a method which, when applied in a system for controlling engine operation on the basis of detected cylinder pressure, enables elimination of output errors caused by, for example, manufacturing variance among pressure sensors.

2. Description of the Prior Art

It is well known to control the operation of an internal combustion engine on the basis of detected cylinder pressure and one such method is disclosed in Japanese Patent Publication No. 46(1971)-3527.

For detection of cylinder pressure, the disclosed method uses pressure sensors disposed in the vicinity of the cylinders and the sensors are required to provide outputs that accurately reflect the absolute pressure during the power stroke. In fact, however, there is always a considerable probability of the output of a sensor including an error component. One reason for this is the variance among such sensors from the time of their manufacture and another is acquired variance (degradation) resulting from cylinder heat and other use environment factors. While it is the general practice to provide pressure sensors used for measurement with water cooling or the like, pressure sensors installed in internal combustion engines are positioned in high-temperature regions, making it difficult to carry out adequate cooling. They are thus apt to produce erroneous outputs.

SUMMARY OF THE INVENTION

In consideration of the foregoing shortcomings of the prior art, it is an object of the invention to provide a method for correction of output error of a pressure sensor used for detecting cylinder pressure in an internal combustion engine. More specifically, it is an object of the invention to provide a cylinder pressure sensor output compensation method for internal combustion engines comprising the steps of determining the deviation from a reference level of the output level of a pressure sensor during a predetermined state of operation (or determining the ratio between such levels), calculating a correction value, and using the correction value to correct the sensor output, thereby enabling correction of errors in sensor output caused by variance in sensor characteristics from the time of manufacture or by degradation of precision through use, and also enabling simplification of temperature compensation.

For achieving the object, the present invention provides a cylinder pressure sensor output compensation method for an internal combustion comprising the steps of detecting the occurrence of a predetermined operating state of the internal combustion engine, determining the cylinder pressure during the predetermined operating state, calculating a correction value from the detected cylinder pressure, and using the correction value for correcting the detected cylinder pressure during an operating state of the engine other than the predetermined state.

BRIEF DESCRIPTION OF THE DRAWINGS

These and other objects and advantages of the present invention will be more apparent from the following description and drawings in which.

DESCRIPTION OF THE PREFERRED EMBODIMENTS

For ease of understanding, a device usable for carrying out the compensation method according to the present invention will be described first.

Figure 1:
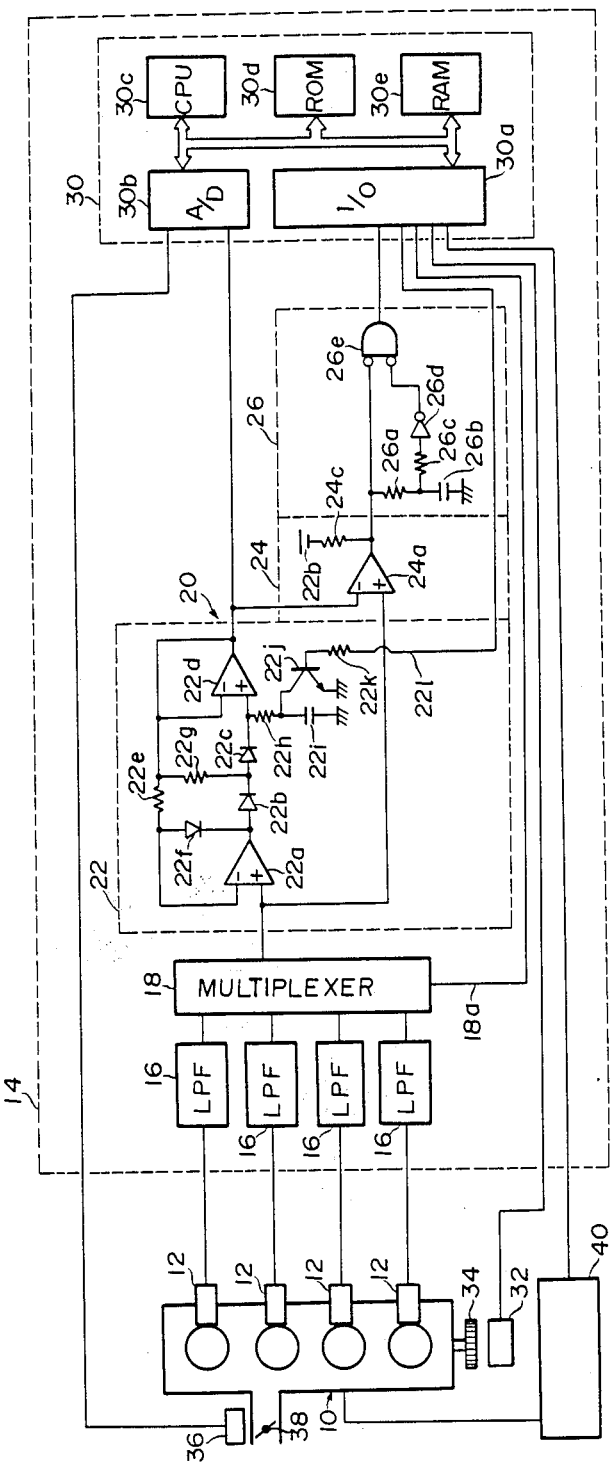
FIG. 1 is a block diagram of a device for carrying out the cylinder pressure sensor output compensation method in internal combustion engine according to this invention.

In FIG. 1, the reference numeral 10 denotes a four-cylinder internal combustion engine. Piezoelectric pressure sensors 12 are disposed one for each cylinder so as to face into the combustion chamber of the cylinder. The outputs of the pressure sensors are passed through charge-voltage converters or high impedance circuits (neither shown) and then forwarded to a control unit 14 in which they are applied to low pass filters 16. The stage following the low pass filters 16 is a multiplexer 18 which is controlled by the CPU of a computer to be described later so as to forward the outputs from the filters 16 to the succeeding stage in the firing order of the cylinders.

Figure 2:
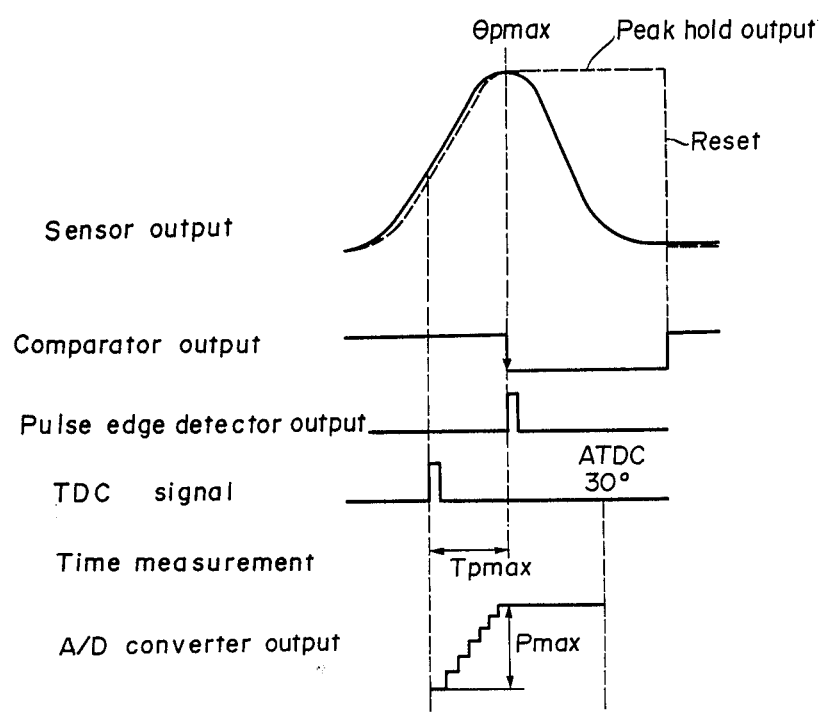
FIG. 2 is a waveform diagram of the output of the pressure signal generator of the device of FIG. 1.

The next stage of the control unit 14 following the multiplexer 18 is a pressure signal generator 20 which is constituted of a peak hold circuit 22, a comparator 24 and a pulse trailing edge detector 26. The output from the multiplexer 18 is first input to the peak hold circuit 22 which holds the peak output of the multiplexer and produces an output as shown in FIG. 2. The circuit 22 includes a first operational amplifier 22a which receives the output of the multiplexer 18 on its non-inverting input terminal. The output terminal of the first operational amplifier 22a is connected through diodes 22b and 22c to the non-inverting terminal of a second operational amplifier 22d connected with a voltage follower, and the output of the second operational amplifier 22d is fed back through a resistor 22e to the inverting terminal of the first operational amplifier 22a. The negative feedback circuit between the first and second operational amplifiers includes a diode 22f and a resistor 22g. The connection line between the diode 22c and the second operational amplifier 22d is connected to ground through a resistor 22h and a capacitor 22i and also to the collector terminal of a transistor 22j which connects with a CPU (to be described later) through a resistor 22k and a reset signal line 22l.

The peak hold circuit 22 is folowed by the comparator 24 which is constituted of a third operational amplifier 24a having a voltage source 24b connected with its output terminal through a resistor 24c. The inverting terminal of the third operational amplifier 24a receives the output of the peak hold circuit 22 while the noninverting terminal thereof is directly connected with the output terminal of the multiplexer 18. As a small difference is given for the inputs to the inverting and non-inverting terminals of the third operational amplifier 24a when the cylinder pressure maximizes, the comparator 24 outputs a pulse signal when the cylinder pressure peaks. (See FIG. 2.) The stage following the comparator 24 is the pulse trailing edge detector 26. This detector 26 is constituted of a resistor 26a, a capacitor 26b, a resistor 26c, an invertor 26d and a NOR gate 26e, and functions to detect the trailing edge of the comparator output and output a pulse of predetermined width for use in facilitating processing operations to be described later. (See FIG. 2.) Therefore, by measuring the time lapse between a predetermined time point such as TDC (top dead center) and the time point at which the pulse is produced it is possible to determine the time point Tpmax at which the cylinder pressure peaks. The value Tpmax can then be converted into the maximum cylinder pressure angle $\theta$pmax by multiplying a time-angle conversion factor.

The stage following the pulse trailing edge detector 26 is a microcomputer 30 having an input/output (I/O) terminal board 30a to which the output from the circuit 26 is applied. In addition to the I/O terminal board 30a, the microcomputer 30 has an A/D converter 30b, a CPU 30c, a ROM (read-only memory) 30d and a RAM (random access memory) 30e. The microcomputer is additionally provided with a timer for measuring the time lapse between a reference time point such as TDC and the time point at which an output pulse is produced by the circuit 26. Further, as will be noted from the figure, the output terminal of the peak hold circuit 22 is also directly connected to the A/D converter 30b, in parallel with the aforesaid connection with the comparator 24. The A/D converter 30b digitally converts the output from the peak hold circuit 22 once per given time or angle interval. The largest data obtained by this conversion is the maximum cylinder pressure Pmax.

A crankshaft angle sensor 32 is disposed in the vicinity of a crankshaft 34 or other rotating member of the internal combustion engine 10 to serve as a means for detecting the crankshaft angle of the pistons (not shown). The sensor 32 produces a cylinder identification signal once per predetermined angle of rotation of the crankshaft, namely, every 720° rotation of the crankshaft in a four-cycle engine during which one cycle of power strokes are completed in the order of, for example, the first, third, fourth and second cylinders. It also produces TDC signals once every 180° rotation of the crankshaft at the time the respective pistons reach top dead center, and further at predetermined angle intervals, for example once every 30°, produces unit angle signals as subdivisions of the TDC angle signal. Therefore, by counting the number of TDC signals following production of the cylinder identification signal, it is possible to discriminate which cylinder is at TDC at the time each TDC signal is produced. The output from the sensor 32 is first shaped in a wave-shaping circuit (not shown) and then input to the CPU 30c via the I/O terminal board 30a. Further, for detecting the load condition of the internal combustion engine 10, the engine is additionally equipped with a negative pressure sensor 36 disposed at an appropriate location between a throttle valve 38 and an intake manifold (not shown), and the output from the negative pressure sensor 36 is sent to the CPU 30c through the A/D converter 30b.

The stage following the control unit 14 is an actuator 40 (an ignition unit or fuel injection unit) which carries out a specific operation in response to the output of the microcomputer 30. At an appropriate angle of rotation following the production of an output from the crankshaft angle sensor 32, the CPU 30 issues a command through the reset signal line 22l for resetting the peak hold circuit 22, and also issues a gate switchover command to the multiplexer 18 through a signal line 18a.

Figure 3:
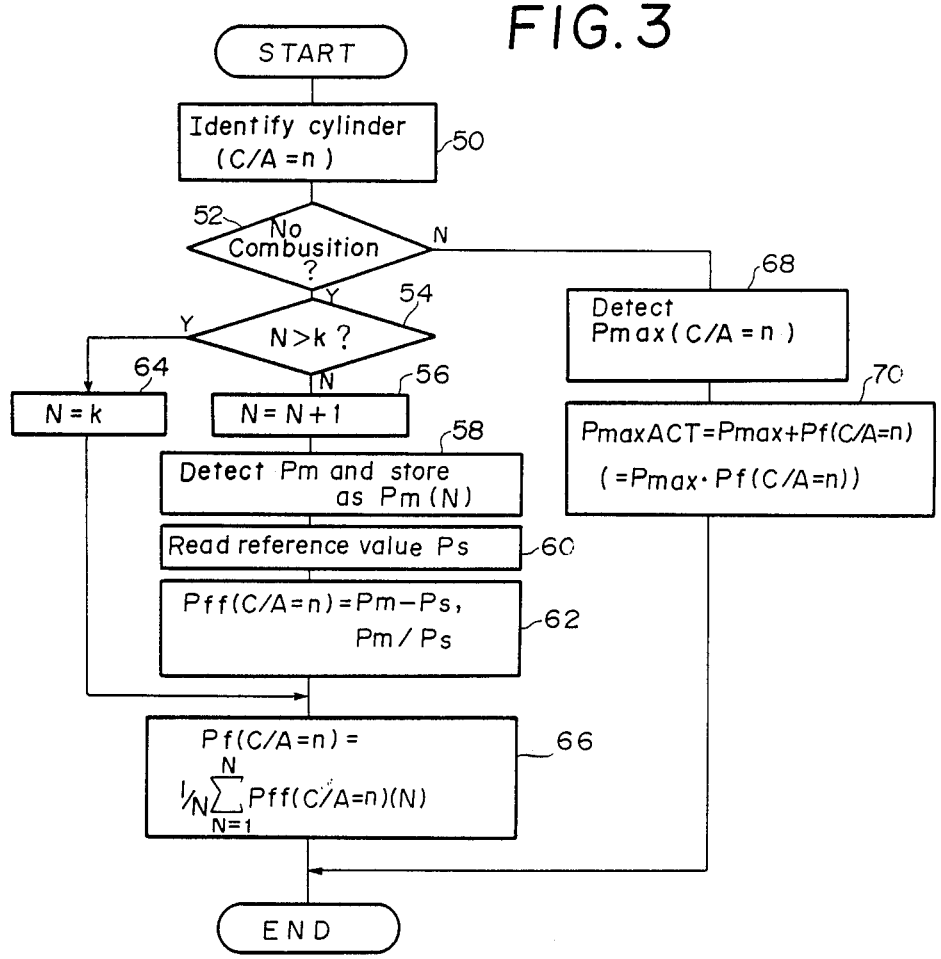
FIG. 3 is a flowchart showing a first embodiment of the method according to this invention.

An embodiment of the cylinder pressure sensor output compensation method according to this invention will now be explained with reference to FIG. 3.

In step 50, the cylinder is identified and assigned a cylinder address (C/A=n). This is done so that compensation can be carried out separately for each of the pressure sensors disposed in association with the respective cylinders.

Next in step 52, a predetermined state of engine operation, namely a state in which no combustion is executed, is detected. This state can be detected with reference to a fuel-cut command signal sent to the actuator 40 by the microcomputer 30, or can be detected with reference to earlier outputs of the crankshaft angle sensor 32 and the negative pressure sensor 36 by detecting when engine operation has entered a fuel-cut region determined by a predetermined combination of engine rpm and negative manifold pressure. It is not advisable to use the state of operation of the engine during misfiring, since the cylinder pressure is not uniform at this time. It is better to use the fuel-cut state since at this time the throttle valve is closed by more than a predetermined degree so that the pressure condition within the cylinder is stable.

Figure 4:
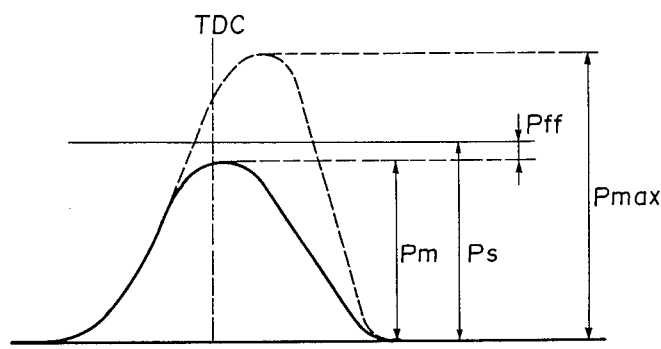
FIG. 4 is a waveform diagram for explaining the compensation method used by the embodiment of FIG. 3.
Figure 5:
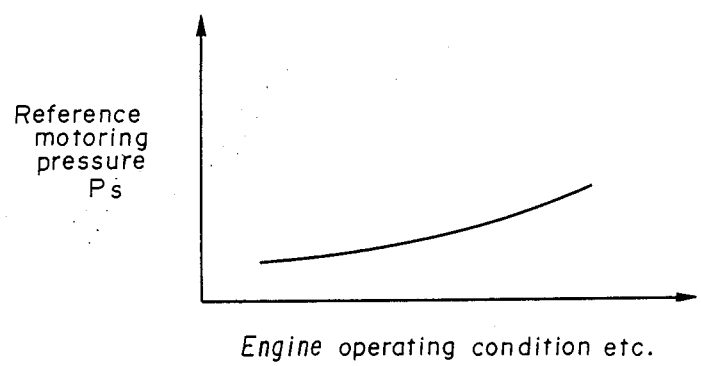
FIG. 5 is a graph for explaining a reference value used in the embodiment of FIG. 3.

Next in step 54, it is determined whether or not the number of non-combustion states N has reached a predetermined value k (for example, 10) and if not, the number of the states is incremented (step 56), whereafter the pressure Pm at the state is detected and stored in the RAM 30e as Pm(N) (step 58), a reference value Ps is read (step 60), and the deviation of the detected pressure Pm from the reference value Ps (or the ratio of the detected pressure Pm to the reference value Ps) Pff (C/A=n) is calculated and stored in the RAM 30e, as illustrated in FIG. 4. When the number of the non-combustion state has exceeded the fixed value k, the operations up to and including step 62 are omitted (step 64). This is for eliminating unnecessary work by appropriately limiting the range over which the average value is calculated. It should be noted that as is well known in the art, there is little difference among engines of the same model in motoring pressure and, moreover, manufacturing variance is also slight. As shown in FIG. 5, the reference value Ps may be made variable dependent on an engine operating condition such as engine rpm or atmospheric pressure, and mapped values may be stored in the ROM 30d and retrieved in accordance with the prescribed operating condition or conditions at the time of detection. If the reference value Ps is thus made variable, it will be possible to use more optimum value for comparison, which works to further enhance the compensating effect.

Next in step 66, the average value is calculated and the correction value Pf (C/A=n) is calculated and stored in the RAM 30e.

This concludes the procedures for calculating the correction value Pf. In applying the calculated correction value Pf, it is first confirmed that the non-combustion state has ended and normal combustion has resumed (step 52). The maximum cylinder pressure value Pmax (C/A=n) for the cylinder concerned is then detected (Step 68) and the true maximum cylinder pressure Pmax ACT is found by adding the correction value Pf to the value Pmax (where the value Pf is obtained as a deviation) or multiplying the value Pmax by the value Pf (where the value Pf is obtained as a ratio).

Figure 6:
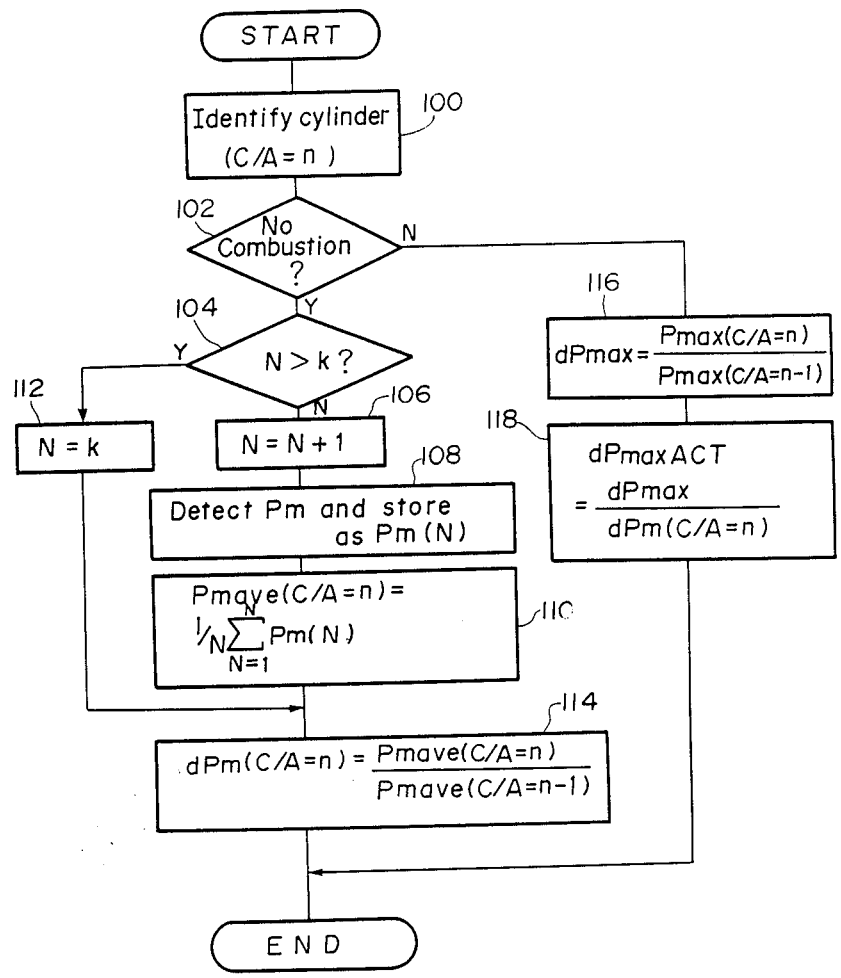
FIG. 6 is a flowchart showing a second embodiment of the method according to this invention.
Figure 7:
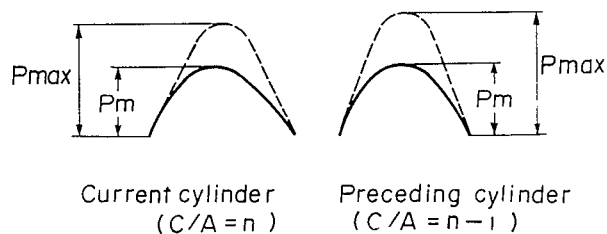
FIG. 7 is a waveform diagram for explaining the compensation method used by the embodiment of FIG. 6.

A second embodiment of the cylinder pressure sensor output compensation method according to this invention is shown in FIG. 6. Only the aspects thereof which differ from the embodiment shown by the flowchart of FIG. 3 will be explained. After carrying out determination and storage of motoring cylinder pressure Pm together with cylinder identification (steps 100-108), an average value Pmave (C/A=n) obtained by averaging the motoring values detected by the sensor associated with one given cylinder over a predetermined number of cycles (where, for example, N=10) is calculated and stored in the RAM 30e (steps 110-112), whereafter the motoring pressure fluctuation rate dPm (C/A=n) between the average value Pmave (C/A=n) and a similarly obtained average value for the cylinder one earlier in the firing order is calculated and stored in the RAM 30e (step 114). The motoring pressure fluctuation rate dPm is used as the correction value. This correction value is used, preferably but should not be limited, for correcting the fluctuation in maximum pressure among different cylinders. More specifically, as shown in FIG. 7, the maximum cylinder pressure Pmax during normal combustion state is determined for a given cylinder (C/A=n) and for the cylinder which fired immediately before the given cylinder, whereafter the rate of fluctuation therebetween is obtained in step 116 as $$dPmax = \frac{Pmax(C/A = n)}{Pmax(C/A = n - 1)}$$

and the so-obtained rate of fluctuation is then divided by the correction value dPm (C/A=n) to obtain the true rate of fluctuation dPmaxACT (step 118). This method can be conveniently used for example to carry out compensation in cases where transient states of engine operation are to be detected on the basis of fluctuation in cylinder pressure. While in the above example the motoring pressure fluctuation rate dPm and the pressure fluctuation rate dPmax during normal combustion state are calculated by comparison with the preceding cylinder in the firing order (C/A=n−1), it is alternatively possible to carry out the comparison with any other cylinder.

Figure 8:
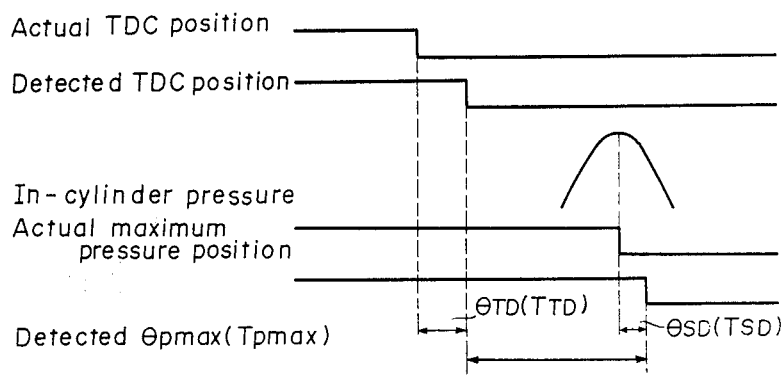
FIG. 8 is a diagram for explaining a method for carrying out compensation for detection lag of a pressure sensor.

As shown in the diagram in FIG. 8, the detection by the pressure sensors is actually somewhat delayed. In the detection of TDC there arises a time or angular delay (θTD or TTD), while in the detection of the maximum pressure position there arises a time or angular delay (θSD or TSD). Therefore the actual maximum pressure angle θpmaxACT has to be derived by the calculation: θpmaxACT=θTD+(θpmax−θSD).

As the method according to the present invention is constituted as described in the foregoing, it has the advantages of enabling correction of errors in sensor output caused by variance in sensor characteristics from the time of manufacture or by degradation of precision through use, while also enabling simplification of temperature compensation.

While the above description discloses preferred embodiments of the invention, it is to be understood that numerous modifications or alterations may be made without departing from the scope of the invention as set forth in the following claims.

What is claimed is:

1. A method for compensating a cylinder pressure sensor output for an internal combustion engine, comprising the steps of:
   detecting an occurrence of a predetermined operation state of the internal combustion engine;
   determining a cylinder pressure during the predetermined operating state;
   calculating a correction value from the detected cylinder pressure by comparing the cylinder pressure determined for a plurality of cylinders during the predetermined operating state; and
   using the correction value for correcting the fluctuation rate in maximum-pressure among the cylinders during an operating state of the engine other than the predetermined state.

2. A method according to claim 1 wherein the predetermined operating state is a motoring state.

3. A method according to claim 2 wherein the motoring state is caused by a fuel cut.

4. A method according to claim 1 wherein said detected cylinder pressure is an averaged value.

5. A method according to any one of claims 1, 2, 3, or 4 wherein said plurality of cylinders has pressure sensors respectively and the correction is carried out separately for each of the sensors.

6. A method for compensating a cylinder pressure sensor output for an internal combustion engine, comprising the steps of:
   detecting the occurrence of a non-combustion state of the engine;
   determining a non-combustion value of the cylinder pressure during the non-combustion state;
   comparing the non-combustion value with a reference value;
   calculating a correction value based on the comparison of the non-combustion value and the reference value;
   detecting a combustion state of the engine;
   determining a combustion value of the cylinder pressure during the combustion state; and
   compensating the combustion value at the combustion state by the correction value.

7. A method according to claim 6 wherein said correction value is a deviation of the non-combustion value from the reference value, and the combustion value at the combustion state is compensated by adding the deviation thereto.

8. A method according to claim 6 wherein said correction value is an averaged value of a deviation of the non-combustion value from the reference value.

9. A method according to claim 6 wherein said correction value is a ratio of the non-combustion value to the reference value, and the combustion value at the combustion state is compensated by multiplying the ratio thereto.

10. A method according to claim 6 wherein said correction value is an averaged value of the ratio of the non-combustion value to the reference value.

11. A method according to claim 6 wherein said non-combustion state is caused by a fuel-cut.

12. A method according to any one of claims 6, 7, 8, 9, 10, or 11 where said internal combustion engine is a multi-cylindered engine which has pressure sensors respectively for the multi-cylinders and the compensation of the combustion value is carried out separately for each of the sensors.

* * * * *